(12) United States Patent
Shin (10) Patent No.: US 7,492,532 B2
(45) Date of Patent: Feb. 17, 2009

(54) OPTICAL LENS SYSTEM

(75) Inventor: Jeong-Kil Shin, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/949,156

(22) Filed: Dec. 3, 2007

(65) Prior Publication Data

US 2008/0130140 A1    Jun. 5, 2008

(30) Foreign Application Priority Data

Dec. 4, 2006    (KR) ...................... 10-2006-0121513

(51) Int. Cl.
*G02B 9/34* (2006.01)

(52) U.S. Cl. ...................................... 359/773; 359/715

(58) Field of Classification Search ................. 359/715, 359/773

See application file for complete search history.

(56) References Cited

U.S. PATENT DOCUMENTS 6,950,246 B2 * 9/2005 Amanai ...................... 359/773

FOREIGN PATENT DOCUMENTS

| JP | 2006-126494 | 5/2006 |
| KR | 2004-60621 | 7/2004 |
| KR | 2006-70814 | 6/2006 |

* cited by examiner

*Primary Examiner*—Evelyn A. Lester
(74) *Attorney, Agent, or Firm*—Cha & Reiter, LLC (57) ABSTRACT

An optical lens system includes a first lens having positive lens power; a second lens having negative lens power; a third lens having positive lens power; and a fourth lens having negative lens power, wherein the first through fourth lenses are sequentially arranged from a subject.

12 Claims, 6 Drawing Sheets

OPTICAL LENS SYSTEM

CLAIM OF PRIORITY

This application claims priority to an application entitled "Optical lens system," filed in the Korean Intellectual Property Office on Dec. 4, 2006 and assigned Serial No. 2006-121513, the contents of which are hereby incorporated by reference.

BACKGROUND OF THE INVENTION

1. Field of the Invention

The present invention relates to a camera, and more particularly to a camera having a hood.

2. Description of the Related Art

In general, an optical lens system having an image sensor such as a CMOS, a CCD, or the like, is employed in a digital camera. A digital camera is typically used in a surveillance camera, a personal computer, a portable radio communication terminal, etc. The trend in the digital camera including an image sensor is towards miniaturization and high pixel count. Recently, the digital camera has been developed to be mounted to various types of electronic appliances such as a portable digital assistant, a portable radio communication terminal, and so forth.

Therefore, a recently developed digital camera requires a miniaturized optical lens system for a camera. That is to say, as the number of pixels (that is, a pixel density) in an image sensor increases, an optical lens system for a camera having an improved optical characteristic is needed in the art.

However, it is difficult to miniaturize an optical lens system for a camera and apply it to a product having a high pixel count. Also, in the case where lenses equipped with high lens power are positioned adjacent to one another, it is difficult to precisely assemble the lenses.

SUMMARY OF THE INVENTION

Accordingly, the present invention has been made to solve the above-mentioned problems occurring in the prior art and provides additional advantages, by providing an improved optical lens system for a camera which is small and has a high resolution.

In accordance with an aspect of the present invention, there is provided an optical lens system including: a first lens having positive lens power; a second lens having negative lens power; a third lens having positive lens power; and a fourth lens having negative lens power, wherein the first through fourth lenses are sequentially arranged from a subject.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PRESENT INVENTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

The present invention relates to an optical lens system which can be mounted to a camera, etc. The optical lens system according to the present invention includes a first lens having positive lens power, a second lens having negative lens power, a third lens having positive lens power, and a fourth lens having negative lens power, wherein the first through fourth lenses are sequentially arranged from a subject.

At least one of the first through fourth lenses has an aspherical surface and is made of plastic.

The optical lens system according to the present invention satisfies Mathematical Expressions (1) to (4) below.

$$1 < \frac{f_1}{f_3} < 1.5 \tag{1}$$

In Mathematical Expression (1), $f_1$ is the effective focal distance of the first lens, and $f_3$ is the effective focal distance of the third lens. Mathematical Expression (1) represents the relationship between the first lens and the third lens. If the lower limit of 1 is not approached, as the lens power of the first lens increases, spherical aberration and comatic aberration increase. If the upper limit of 1.5 is exceeded, it is difficult to correct chromatic aberration.

$$1.3 < \frac{f_4}{f_2} < 2.0 \tag{2}$$

In Mathematical Expression (2), $f_4$ is the effective focal distance of the fourth lens, and $f_2$ is the effective focal distance of the second lens. Mathematical Expression (2) represents the relationship between the fourth lens and the second lens. If the lower limit of 1.3 is not approached, as the lens power of the second lens increases, spherical aberration and comatic aberration increase. If the upper limit of 2.0 is exceeded, it is difficult to correct chromatic aberration.

$$0.4 < \frac{f_3}{f} < 0.7 \tag{3}$$

In Mathematical Expression (3), $f_3$ is the effective focal distance of the third lens, and f is the effective focal distance of the entire optical lens system. Mathematical Expression (3) represents the lens power of the third lens. If the lower limit of 0.4 is not approached, the spherical aberration of the image obtained through the optical lens system increases. If the upper limit of 0.7 is exceeded, field curvature increases.

$$-1 < \frac{f_4}{f} < -0.4 \qquad (4)$$

In Mathematical Expression (4), $f_4$ is the effective focal distance of the fourth lens, and f is the effective focal distance of the entire optical lens system.

The optical lens system according to the present invention satisfies Mathematical Expression (5) below.

$$20 < \upsilon d_1 - \upsilon d_2 \qquad (5)$$

In Mathematical Expression (5), $\upsilon d_1$ is the Abbe's number of the first lens, and $\upsilon d_2$ is the Abbe's number of the second lens. If the lower limit of 20 is not approached, it is difficult to correct chromatic aberration.

An Abbe's number denotes the reciprocal of a dispersion number. In Mathematical Expression (5), d means the wavelength of 587.5618 nm (the helium d-line) which is used in the calculation of an Abbe's number in Mathematical Expression (6) below.

$$\upsilon d = \frac{(Nd - 1)}{(Nf - Nc)} \qquad (6)$$

In Mathematical Expression (6), Nd is a refractive index in the case of the helium d-line (wavelength of 587.5618 mm), Nf is a refractive index in the case of the hydrogen f-line (wavelength of 486.1327 nm), and Nc is a refractive index in the case of the hydrogen c-line (wavelength of 656.2725 nm).

In Mathematical Expression (5), the subscripts 1 and 2 are used to differentiate the first and second lenses, and the symbol d can be omitted in the designation of an Abbe's number (hereafter, the symbol d will be omitted in the designation of an Abbe's number).

The optical lens system according to the present invention satisfies Mathematical Expression (7) below.

$$\frac{TTL}{f} < 1.3 \qquad (7)$$

In Mathematical Expression (7), TTL is a distance from the first surface of the first lens to an image surface, and/is the effective focal distance of the entire optical lens system. Mathematical Expression (7) represents the overall length of the optical lens system, and 1.3 means the upper limit for miniaturization of the optical lens system.

In the optical lens system, an iris can be arranged between the first lens and the subject, and in some cases, the first surface of the first lens can serve as an iris. Besides, an iris can be arranged between the first lens and the second lens, or the second surface of the first lens can serve as an iris.

FIRST EMBODIMENT

Figure 1:
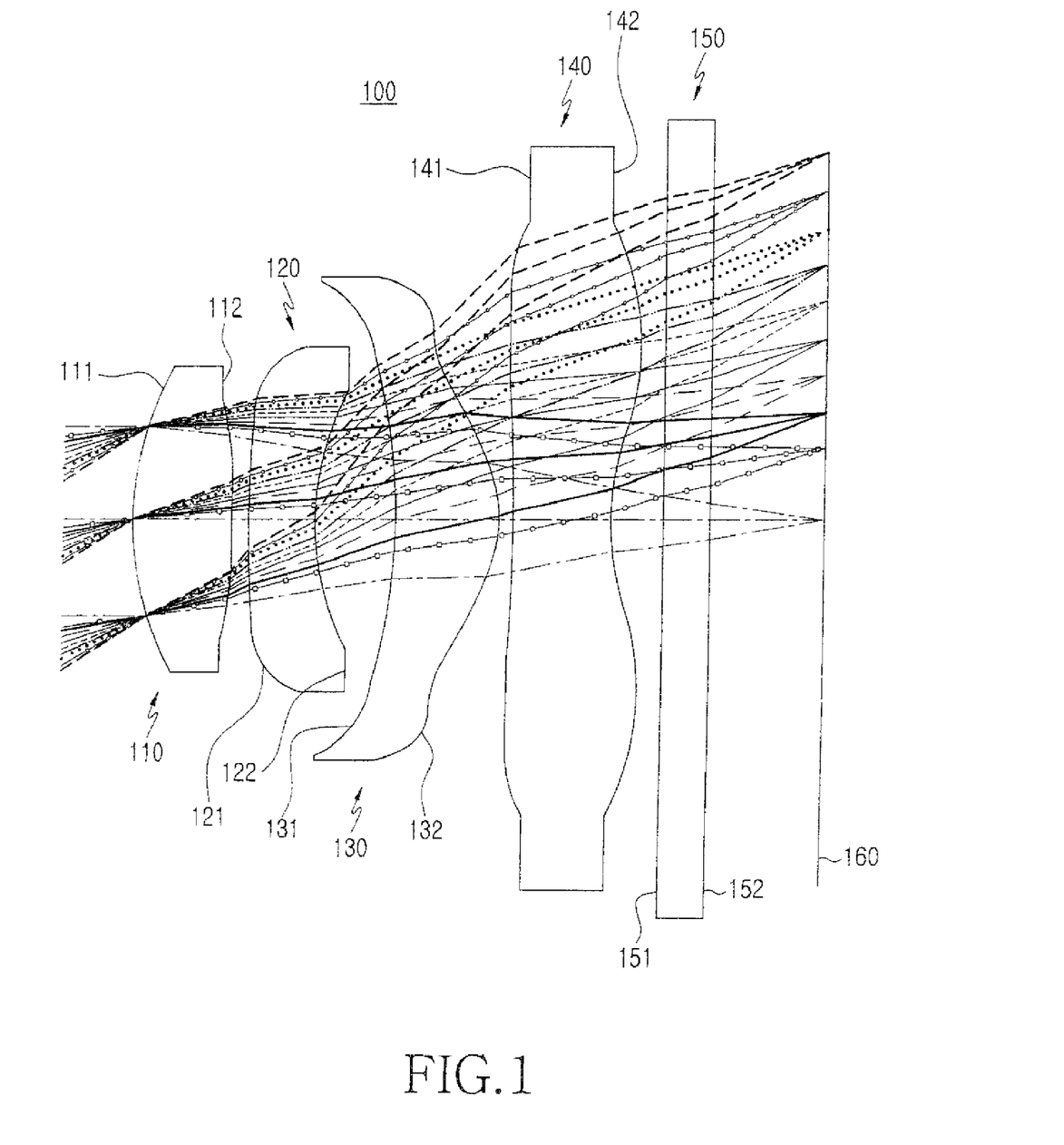
FIG. 1 is a view illustrating an optical lens system according to a first embodiment of the present invention.

FIG. 1 is a view illustrating an optical lens system according to a first embodiment of the present invention. As shown, the optical lens system 100 according to this first embodiment of the present invention includes first through fourth lenses 110, 120, 130 and 140, an image sensor 160, and an optical filter 150 arranged between the image sensor 160 and the fourth lens 140. The first lens 110 has a first surface 111 (S1) and a second surface 112 (S2), the second lens 120 has a third surface 121 (S3) and a fourth surface 122 (S4), and the third lens 130 has a fifth surface 131 (S5) and a sixth surface 132 (S6). Also, the fourth lens 140 has a seventh surface 141 (S7) and an eighth surface 142 (S8). The first surface 111 (S1) of the first lens 110 can serve as an iris, and the position of the iris can be changed as desired by a user when designing the optical lens system 100.

The optical lens system 100 according to this embodiment of the present invention satisfies the above-described Mathematical Expressions (1) through (7) and the following conditions given in Table 1. In Table 1, f is the focal distance of the entire optical lens system 100, r is a radius of curvature of a corresponding lens surface, and l is the thickness of a lens or the distance between lenses. In Tables given below, $\upsilon$ designates an Abbe's number (while $\upsilon$ is identical to $\upsilon d$ of Mathematical Expression (6), hereinbelow, d will be omitted, and only u will be used to designate an Abbe's number). The mm unit is employed for a length.

The overall effective focal distance of the optical lens system 100 according to the present embodiment is 3.5 mm, f number (f/#) is 2.8, and an angle of view (2ω) is 66.5°.

TABLE 1

| surface condition | R | L | n | υ | remarks |
|---|---|---|---|---|---|
| S1 | aspherical | 1.783 | 0.621 | 1.530 | 55.8 | iris |
| S2 | aspherical | -4.288 | 0.113 | | | |
| S3 | aspherical | 8.490 | 0.411 | 1.639 | 23.4 | |
| S4 | aspherical | 1.775 | 0.510 | | | |
| S5 | aspherical | -2.319 | 0.648 | 1.530 | 55.8 | |
| S6 | aspherical | -0.796 | 0.090 | | | |
| S7 | aspherical | -42.439 | 0.620 | 1.530 | 55.8 | |
| S8 | aspherical | 1.162 | 0.315 | | | |
| S9 | | ∞ | 0.3 | 1.517 | 64.2 | |
| S10 | | ∞ | 0.7 | | | |

Tables 1 provides data which reveals the basic optical characteristics of the optical lens system 100 according to the present embodiment. That is to say, Table 1 represents the optical characteristics (a radius of curvature, a refractive index, an Abbe's number) of the first through fourth lenses 110 through 140, the optical filter 150, etc., which constitute the optical lens system 100. Referring to Table 1, in the present embodiment, it is to be readily understood that the first surface 111 (S1) of the first lens 110 performs the function of an iris.

Referring to Table 1, the thickness of the first lens 110 is 0.621 mm, and the distance from the second surface 112 (S2) of the first lens 110 to the third surface 121 (S3) of the second lens 120 is 0.113 mm. Also, the first lens 110 has a refractive index of 1.530 and an Abbe's number of 55.8. In Table 1, S1 denotes the first surface 111 of the first lens 110, and the symbols l, n and υ excluding r (radius of curvature) designate the optical characteristics of the first lens 110. Also, S3, S5 and S7 represent l, n and υ characteristics of the second through fourth lenses 120, 130 and 140. The symbol r designates the radius of curvature of a corresponding surface.

In the present embodiment, the optical filter 150 can be arranged between the image sensor 160 and the eighth surface 142 (S8) of the fourth lens 140. The optical filter 150 has a ninth surface 151 (S9) and a tenth surface 152 (S10).

Mathematical Expression (8) below is adopted in the design of aspherical surfaces in the present and the following embodiments.

$$x = \frac{c^2 y^2}{1 + \sqrt{1 - (K+1)c^2 y^2}} + Ay^4 + By^6 + Cy^8 + Dy^{10} + Ey^{12} \quad (8)$$

In Mathematical Expression (8), x is the size of a lens measured from an apex in the direction of an optical axis, and y is the size of the lens measured in the direction perpendicular to the optical axis. Also, c is a reciprocal of the radius of curvature at the apex of the lens, and K is a conic constant.

A, B, C and D represent respective aspherical coefficients.

The following Table 2 provides aspherical surface design data of the respective first through fourth lenses 110 through 140.

TABLE 2

|    | K          | A             | B              | C              | D             |
|----|------------|---------------|----------------|----------------|---------------|
| S1 | -1.687059  | 0.132625E-01  | 0.345878E-02   | 0.141762E+00   | 0.134290E+00  |
| S2 |            | 0.105947E+00  | -0.365636E+00  | 0.332240E+00   |               |
| S3 |            | 0.118393E+00  | -0.417727E+00  | 0.438847E+00   |               |
| S4 | 2.095797   | 0.297624E-01  | -0.232413E+00  | 0.146462E+00   |               |
| S5 | -0.344280  | 0.259796E-01  | 0.158739E+00   | 0.125593E+00   | 0.214694E-01  |
| S6 | -3.111465  | -0.133051E+00 | 0.139008E+00   | 0.459230E-01   | -0.381836E-01 |
| S7 | 398.381580 | -0.530388E-01 | 0.423236E-01   | -0.986005E-02  | 0.884700E-03  |
| S8 | -9.571073  | -0.985531E-01 | 0.355642E-01   | -0.952298E-02  | 0.109635E-02  |

Figure 2:
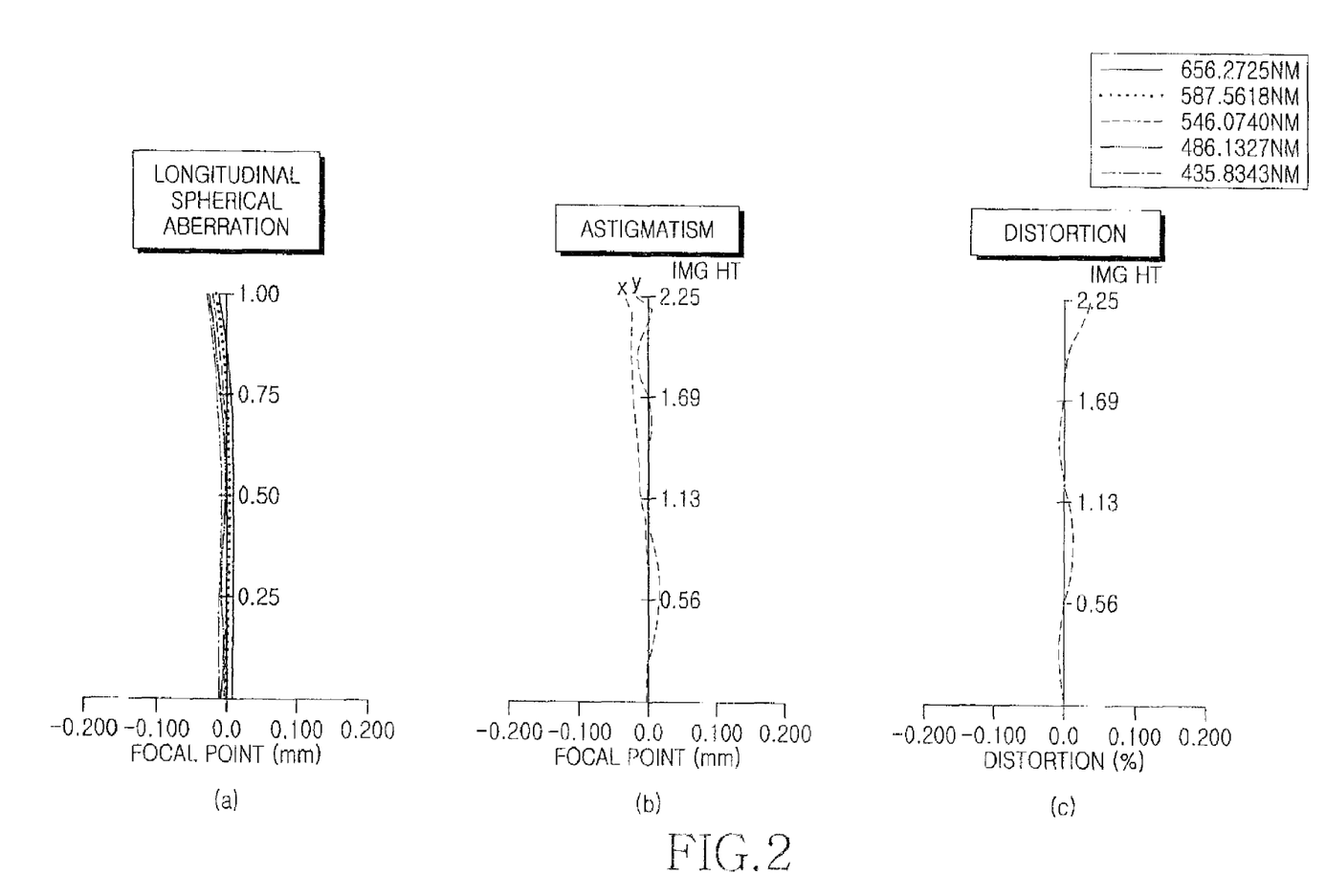
FIG. 2 is graphs illustrating the aberration characteristics of the optical lens system shown in FIG. 1.

FIG. 2 is graphs illustrating the aberration characteristics of the optical lens system 100 shown in FIG. 1. In FIG. 2, light having the wavelength of 435~656.2725 nm was employed to measure the aberrations of FIG. 2. FIG. 2(a) is a graph which illustrates longitudinal spherical aberration measured depending upon the wavelength of light.

FIG. 2(b) is a graph which is obtained by measuring astigmatic aberration in a direction perpendicular to the optical axis of the light having the wavelength of 546.0740 nm. Assuming that the direction in which light travels is the optical axis (z), the astigmatic aberrations on x and y axes are illustrated. FIG. 2(c) is a graph which illustrates distortion, that is, percentage (%) of distortion of the light having the wavelength of 546.0740 nm depending upon the height of an image. It is to be appreciated that no change occurs up to 1.69 mm, and distortion less than 1.0% occurs at a height which is greater than that.

SECOND EMBODIMENT

Figure 3:
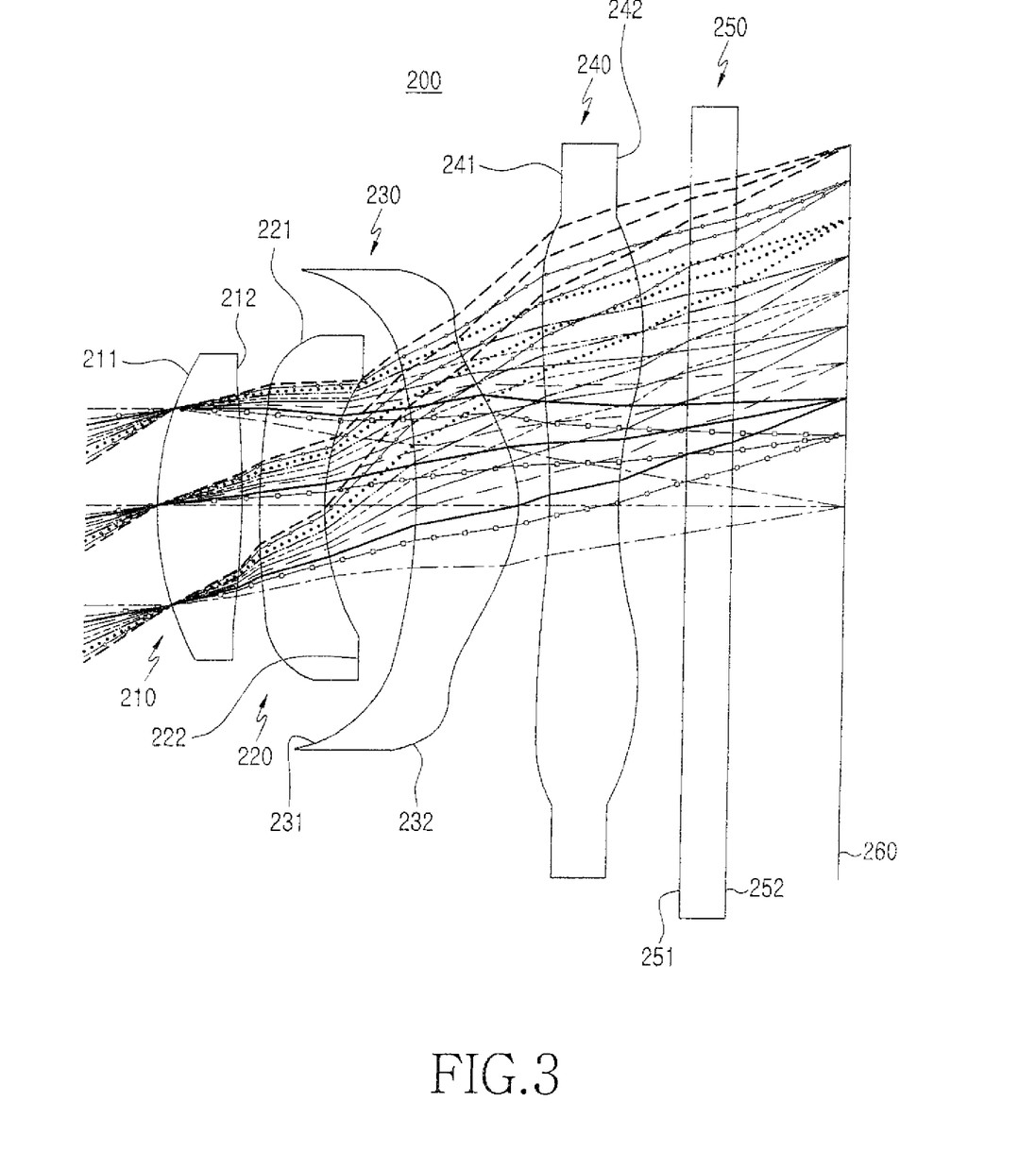
FIG. 3 is a view illustrating an optical lens system according to a second embodiment of the present invention.

FIG. 3 is a view illustrating an optical lens system according to a second embodiment of the present invention. As shown, the optical lens system 200 according to this second embodiment of the present invention includes first through fourth lenses 210, 220, 230 and 240, an image sensor 260, and an optical filter 250. The first lens 210 has a first surface 211 (S1) and a second surface 212 (S2), the second lens 220 has a third surface 221 (S3) and a fourth surface 222 (S4), the third lens 230 has a fifth surface 231 (S5) and a sixth surface 232 (S6), and the fourth lens 240 has a seventh surface 241 (S7) and an eighth surface 242 (S8).

The following Table 3 provides the optical characteristics, intervals and thicknesses of the respective lenses 210 through 240 and the optical filter 250, which constitute the optical lens system 200 of the present embodiment. The optical lens system 200 of the present embodiment is based on the same conditions as the first embodiment (that is, the overall effective focal distance f is 3.5 mm, f number (f/#) is 2.8, and an angle of view (2ω) is 66.5°).

TABLE 3

| surface condition |            | R       | l     | N     | Y    | remarks |
|-------------------|------------|---------|-------|-------|------|---------|
| S1                | aspherical | 1.765   | 0.520 | 1.530 | 55.8 | iris    |
| S2                | aspherical | -5.043  | 0.115 |       |      |         |
| S3                | aspherical | 5.399   | 0.400 | 1.639 | 23.4 |         |
| S4                | aspherical | 1.609   | 0.577 |       |      |         |
| S5                | aspherical | -2.258  | 0.657 | 1.530 | 55.8 |         |
| S6                | aspherical | -0.788  | 0.175 |       |      |         |

TABLE 3-continued

| surface condition |            | R       | l     | N     | Y    | remarks |
|-------------------|------------|---------|-------|-------|------|---------|
| S7                | aspherical | -39.352 | 0.440 | 1.530 | 55.8 |         |
| S8                | aspherical | 1.206   | 0.416 |       |      |         |
| S9                |            | ∞       | 0.3   | 1.517 | 64.2 |         |
| S10               |            | ∞       | 0.7   |       |      |         |

Table 3 illustrates the basic optical characteristics of the optical lens system 200 according to the present embodiment. That is to say, Table 3 illustrates the optical characteristics (including a radius of curvature, an interval, a refractive index, and an Abbe's number) of the first through fourth lenses 210 through 240 and the optical filter 250, which constitute the optical lens system 200. Referring to Table 3, in the present embodiment, it is to be understood that the first surface 211 (S1) of the first lens 210 performs the function of an iris.

Referring to Table 3, the thickness of the first lens 210 is 0.520 mm, and the distance from the second surface 212 (S2) of the first lens 210 to the third surface 221 (S3) of the second lens 220 is 0.115 mm. Also, the first lens 210 has a refractive index of 1.530 and an Abbe's number of 55.8. In Table 1, S1 denotes the first surface 211 of the first lens 210, and the symbols l, n and υ excluding r (radius of curvature) designate the optical characteristics of the first lens 210. Also, S3, S5 and S7 represent l, n and υ characteristics of the second through fourth lenses 220, 230 and 240.

In the present embodiment, the optical filter 250 can be arranged between the image sensor 260 and the eighth surface 242 (S8) of the fourth lens 240. The optical filter 250 has a ninth surface 251 (S9) and a tenth surface 252 (S10). Also, the aspherical surfaces of the present embodiment satisfy the above-described Mathematical Expression (8). The following Table 4 provides aspherical surface design data of the respective first through fourth lenses 210 through 240.

TABLE 4

|    | K          | A             | B              | C             | D              |
|----|------------|---------------|----------------|---------------|----------------|
| S1 | −1.531430  | 0.161074E−01  | −0.359165E−02  | 0.108425E+00  | 0.105203E+00   |
| S2 |            | 0.128970E+00  | −0.363977E+00  | 0.350781E+00  |                |
| S3 |            | 0.132750E+00  | −0.393994E+00  | 0.431878E+00  |                |
| S4 | 1.764084   | 0.475038E−02  | −0.219254E+00  | 0.129896E+00  |                |
| S5 | 0.702098   | −0.198331E−01 | 0.194910E+00   | −0.113223E+00 | 0.926236E−02   |
| S6 | −3.232841  | −0.179884E+00 | 0.153732E+00   | 0.516941E−01  | −0.404593E−01  |
| S7 | 400.691010 | −0.582183E−01 | 0.422571E−01   | −0.965916E−02 | 0.905382E−03   |
| S8 | −10.172361 | −0.103548E+00 | 0.358552E−01   | −0.948388E−02 | 0.115106E−02   |

Figure 4:
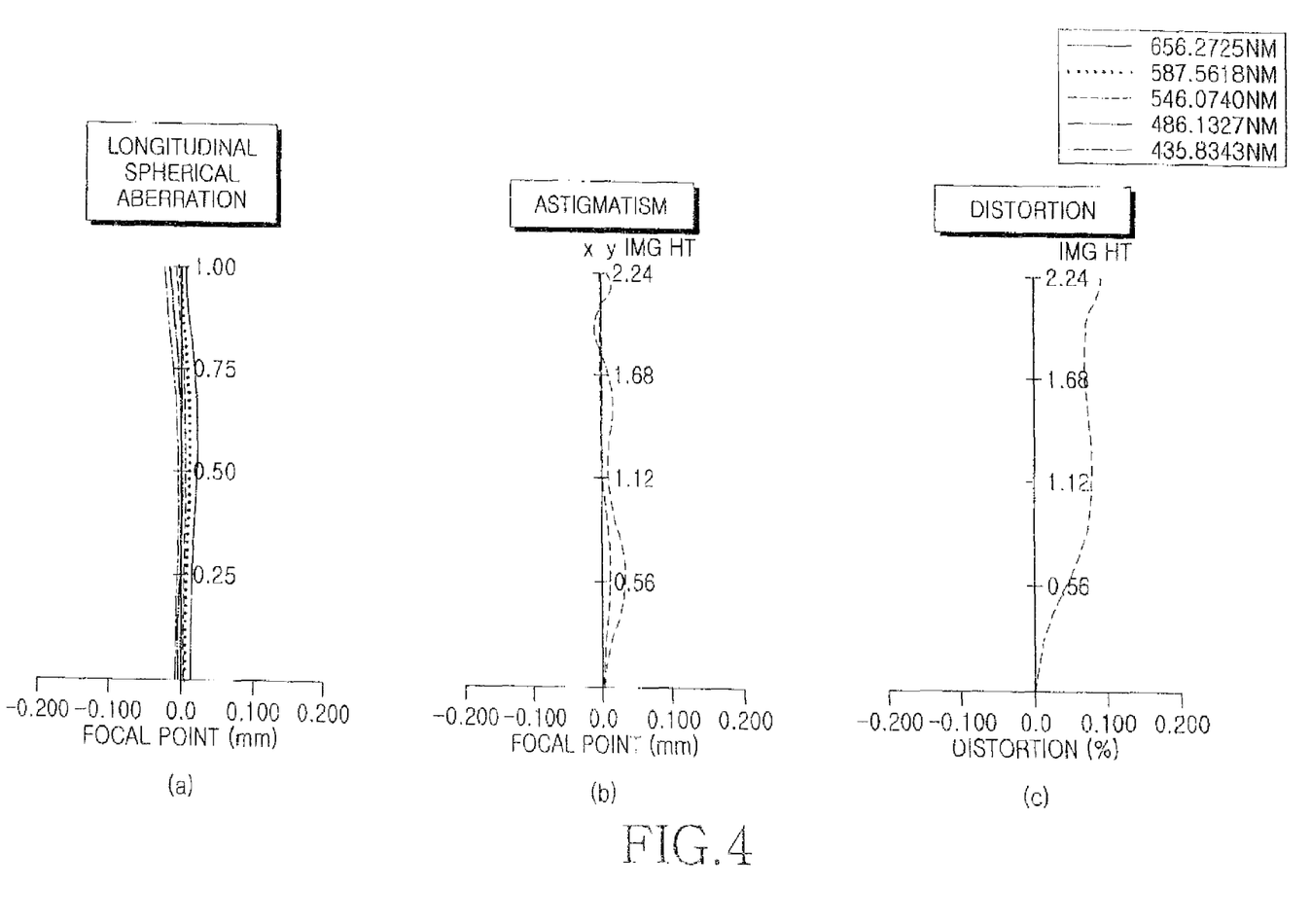
FIG. 4 is graphs illustrating the aberration characteristics of the optical lens system shown in FIG. 3.

FIG. 4 is graphs illustrating the aberration characteristics of the optical lens system 200 shown in FIG. 3. In FIG. 4, light having the wavelength of 435~656.2725 nm was employed to measure the aberrations of FIG. 4. FIG. 4(a) is a graph which illustrates longitudinal spherical aberration measured depending upon the wavelength of light.

FIG. 4(b) is a graph which is obtained by measuring astigmatic aberration in a direction perpendicular to the optical axis of the light having the wavelength of 546.0740 nm. Assuming that the direction in which light travels is the optical axis (z), the astigmatic aberrations on x and y axes are illustrated. As shown in FIG. 4(b), the astigmatic aberrations of the optical lens system according to the present embodiment on the x and y axes are constant within the range less than ±0.1.

FIG. 4(c) is a graph which illustrates distortion, that is, percentage (%) of distortion of the light having the wavelength of 546.0740 nm depending upon the height of an image. It is to be appreciated that no change occurs up to 1.69 mm, and distortion less than 1.0% occurs at a height which is greater than that.

THIRD EMBODIMENT

Figure 5:
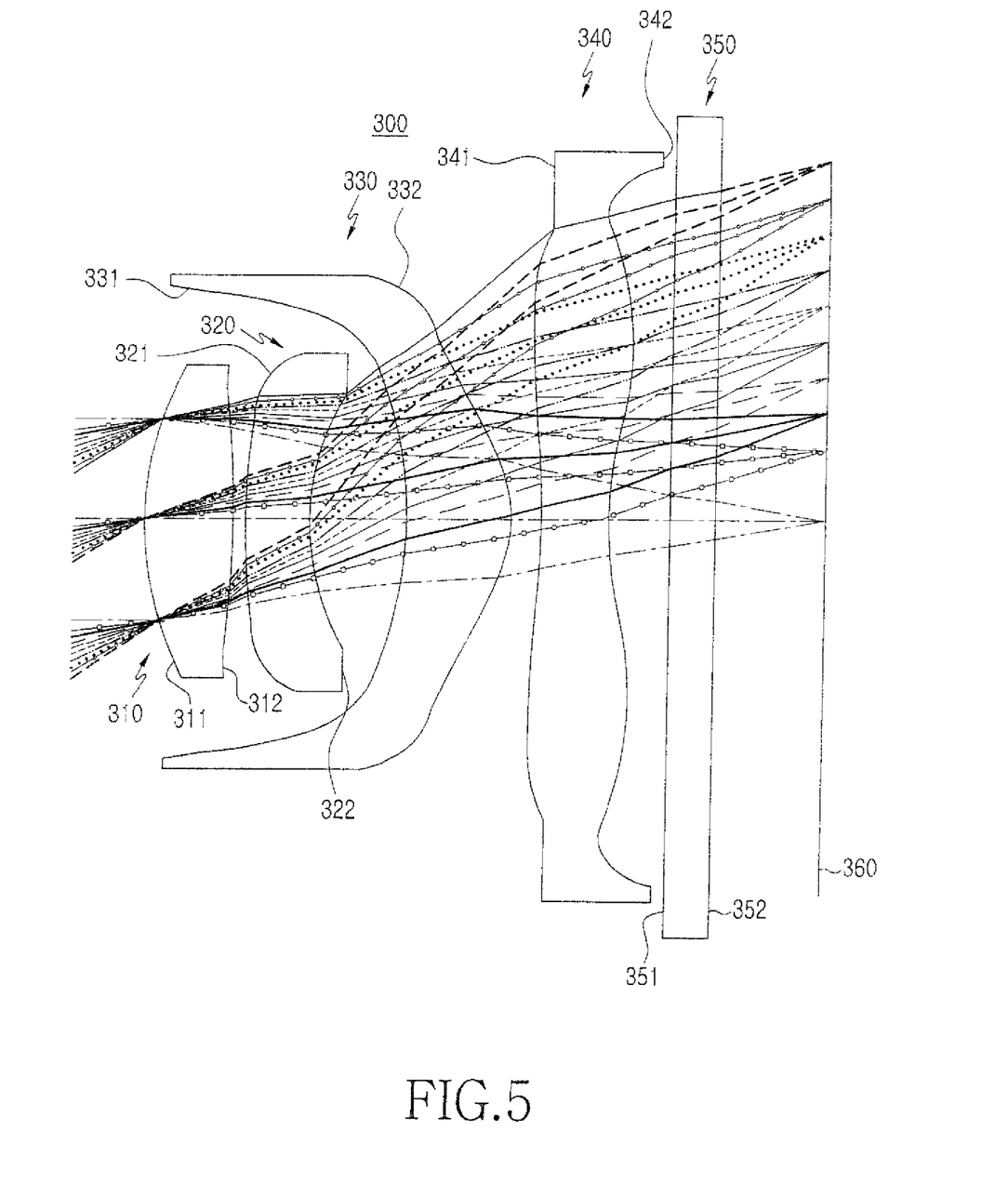
FIG. 5 is a view illustrating an optical lens system according to a third embodiment of the present invention.

FIG. 5 is a view illustrating an optical lens system according to a third embodiment of the present invention. As shown, the optical lens system 300 according to this third embodiment of the present invention includes first through fourth lenses 310, 320, 330 and 340, an image sensor 360, and an optical filter 350.

The following Table 5 provides the optical characteristics, intervals and thicknesses of the respective lenses 310 through 340 and the optical filter 350, which constitute the optical lens system 300 of the present embodiment. The optical lens system 300 of the present embodiment is based on the same conditions as the first embodiment (that is, the overall effective focal distance f is 3.5 mm, f number (f/#) is 2.8, and an angle of view (2ω) is 66.5°).

TABLE 5

| surface condition | R | l | n | υ | remarks |
|---|---|---|---|---|---|
| S1 | aspherical | 1.71037 | 0.545075 | 1.530 | 55.8 | Iris |
| S2 | aspherical | −5.07311 | 0.09 | | | |
| S3 | aspherical | 5.130765 | 0.4 | 1.639 | 23.4 | |

TABLE 5-continued

| surface condition | R | l | n | υ | remarks |
|---|---|---|---|---|---|
| S4 | aspherical | 1.550323 | 0.602462 | | | |
| S5 | aspherical | −2.47442 | 0.681484 | 1.530 | 55.8 | |
| S6 | aspherical | −0.81139 | 0.156862 | | | |
| S7 | aspherical | −44.925 | 0.44 | 1.530 | 55.8 | |
| S8 | aspherical | 1.213822 | 0.384118 | | | |
| S9 | | ∞ | 0.3 | 1.517 | 64.2 | |
| S10 | | ∞ | 0.7 | | | |

Table 5 illustrates the basic optical characteristics of the optical lens system 300 according to the present embodiment. That is to say, Table 5 illustrates the optical characteristics (including a radius of curvature, an interval, a refractive index, and an Abbe's number) of the first through fourth lenses 310 through 340 and the optical filter 350, which constitute the optical lens system 300. Referring to Table 5, in the present embodiment, it is to be understood that the first surface 311 (S1) of the first lens 310 performs the function of an iris.

Referring to Table 5, the thickness of the first lens 310 is 0.545075 mm, and the distance from the second surface 312 (S2) of the first lens 310 to the third surface 321 (S3) of the second lens 320 is 0.09 mm. Also, the first lens 310 has a refractive index of 1.530 and an Abbe's number of 55.8. In Table 1, S1 denotes the first surface 311 of the first lens 310, and the symbols l, n and υ excluding r (radius of curvature) designate the optical characteristics of the first lens 310. Also, S3, S5 and S7 represent l, n and υ characteristics of the second through fourth lenses 320, 330 and 340.

In the present embodiment, the optical filter 350 can be arranged between the image sensor 360 and the eighth surface 342 (S8) of the fourth lens 340. The optical filter 350 has a ninth surface 351 (S9) and a tenth surface 352 (S10). Also, the aspherical surfaces of the present embodiment satisfy the above-described Mathematical Expression (8). The following Table 6 provides aspherical surface design data of the respective first through fourth lenses 310 through 340.

TABLE 6

|  | K | A | B | C | D |
|---|---|---|---|---|---|
| S1 | −1.463708 | 0.173257E−01 | −0.377989E−02 | 0.103567E+00 | 0.102032E+00 |
| S2 | 0.062096 | 0.124875E+00 | −0.349809E+00 | 0.330231E+00 | 0.258785E−02 |
| S3 | 3.864732 | 0.112253E+00 | −0.372710E+00 | 0.487427E+00 | −0.936468E−01 |
| S4 | 1.416216 | −0.218066E−01 | −0.157651E+00 | 0.111091E+00 | 0.588574E−02 |
| S5 | 1.681684 | −0.414864E−01 | 0.140873E+00 | −0.646771E−01 | −0.159357E−01 |
| S6 | −3.327528 | −0.168482E+00 | 0.122373E+00 | 0.359170E−01 | −0.287494E−01 |
| S7 | 522.934092 | −0.573610E−01 | 0.418083E−01 | −0.954537E−02 | 0.913216E−03 |
| S8 | −9.968378 | −0.990169E−01 | 0.344211E−01 | −0.934957E−02 | 0.120638E−02 |

Figure 6:
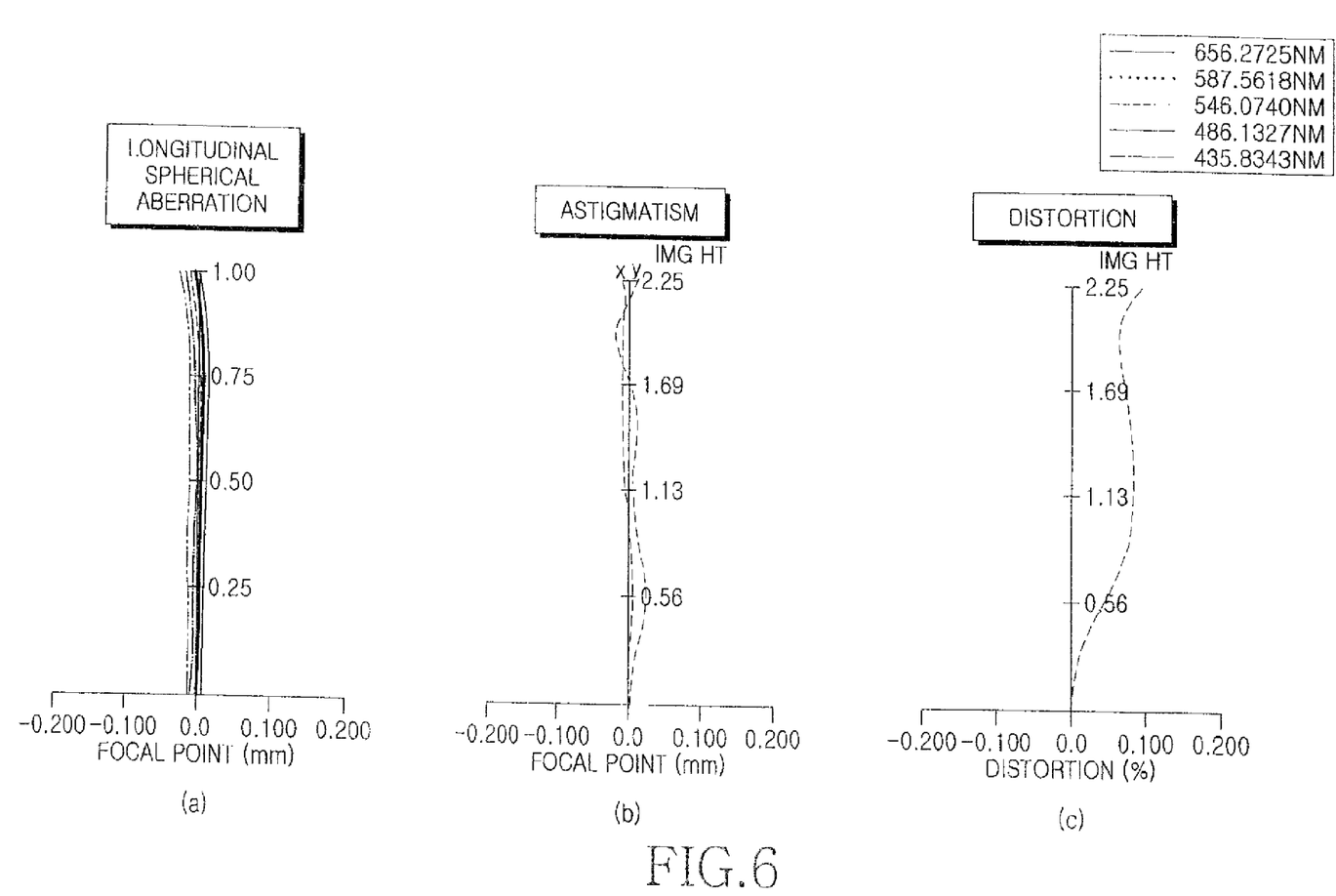
FIG. 6 is graphs illustrating aberration characteristics of the optical lens system shown in FIG. 5.

FIG. 6 is graphs illustrating the aberration characteristics of the optical lens system 300 shown in FIG. 5. In FIG. 6, light having the wavelength of 435~656.2725 nm was employed to measure the aberrations of FIG. 6. FIG. 6(a) is a graph which illustrates longitudinal spherical aberration measured depending upon the wavelength of light.

FIG. 6(b) is a graph which is obtained by measuring astigmatic aberration in a direction perpendicular to the optical axis of the light having the wavelength of 546.0740 nm. Assuming that the direction in which light travels is the optical axis (z), the astigmatic aberrations on x and y axes are illustrated. As shown in FIG. 6(b), the astigmatic aberrations of the optical lens system according to the present embodiment on the x and y axes are constant within the range less than ±0.1.

FIG. 6(c) is a graph which illustrates distortion, that is, percentage (%) of distortion of the light having the wavelength of 546.0740 nm depending upon the height of an image. It is to be appreciated that the distortion occurs within the range less than 1.0%.

The optical lens system according to the present invention provides advantages in that, since it includes four aspherical lenses, a high resolution and a light weight can be achieved while the optical lens system can be miniaturized.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An optical lens system having an effective focal distance f comprising:
   a first lens having positive lens power and an effective focal distance $f_1$;
   a second lens having negative lens power and an effective focal distance $f_2$;
   a third lens having positive lens power and an effective focal distance $f_3$; and
   a fourth lens having negative lens power and an effective focal distance $f_4$,
   wherein the first through fourth lenses are sequentially arranged from a subject, and satisfy at least the following conditions:

$$1 < \frac{f_1}{f_3} < 1.5;$$

$$1.3 < \frac{f_4}{f_2} < 2.0.$$

2. The optical lens system according to claim 1, wherein at least one of the first through fourth lenses has an aspherical surface.

3. The optical lens system according to claim 1, wherein at least one of die first through fourth lenses is made of plastic.

4. The optical lens system according to claim 1, wherein the optical lens system satisfies the following mathematical expression:

$$0.4 < \frac{f_3}{f} < 0.7.$$

5. The optical lens system according to claim 4, wherein the optical lens system satisfies the following mathematical expression:

$$20 < \upsilon d_1 - \upsilon d_2$$

where $\upsilon d_1$ is an Abbe's number of the first lens, and $\upsilon d_2$ is an Abbe's number of the second lens.

6. The optical lens system according to claim 1, wherein the optical lens system satisfies the following mathematical expression:

$$\frac{TTL}{f} < 1.3$$

where TTL is a distance from a first surface of the first lens facing the subject to an image surface, and f is an effective focal distance of the entire optical lens system.

7. The optical lens system according to claim 1, wherein the optical lens system satisfies the following mathematical expression:

$$-1 < \frac{f_4}{f} < -0.4.$$

8. The optical lens system according to claim 1, further comprising an iris arranged between to first lens and the subject.

9. The optical lens system according to claim 1, wherein a first surface of the first lens comprises an iris.

10. The optical lens system according to claim 1, further comprising an iris arranged between the first lens and the second lens.

11. The optical lens system according to claim 1, wherein a second surface of the first lens comprises an iris.

12. The optical lens system according to claim 1, wherein the optical lens system satisfies the following mathematical expression:

$$20 < \upsilon d_1 - \upsilon d_2$$

where $\upsilon d_1$ is an Abbe's number of the first lens, and $\upsilon d_2$ is an Abbe's number of the second lens.

* * * * *